United States Patent
Mitter et al.

(10) Patent No.: US 12,530,269 B2
(45) Date of Patent: Jan. 20, 2026

(54) METHOD FOR MONITORING A CLOCK GENERATOR MODULE OF AN ELECTRONIC CIRCUIT

(71) Applicant: Robert Bosch GmbH, Stuttgart (DE)

(72) Inventors: Carsten Mitter, Ditzingen (DE); Sai Gautam Janaki Premkumar, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 18/408,936

(22) Filed: Jan. 10, 2024

(65) Prior Publication Data

US 2024/0248818 A1   Jul. 25, 2024

(30) Foreign Application Priority Data

Jan. 24, 2023   (DE) ..................... 10 2023 200 498.4

(51) Int. Cl.
  *G01R 31/317*  (2006.01)
  *G06F 1/08*    (2006.01)
  *G06F 11/16*   (2006.01)

(52) U.S. Cl.
  CPC ............ *G06F 11/1604* (2013.01); *G06F 1/08* (2013.01); *G01R 31/31727* (2013.01)

(58) Field of Classification Search
  CPC ........ G06F 11/1604; G06F 1/08; H03L 7/085; H03L 7/089; G01R 31/31727
  See application file for complete search history.

(56) References Cited

U.S. PATENT DOCUMENTS

| | | | | |
|---|---|---|---|---|
| 5,621,758 A | * | 4/1997 | Suzuki | H04L 25/4902 327/31 |
| 6,057,722 A | * | 5/2000 | Nakabo | G06F 7/62 327/172 |
| 2005/0024896 A1 | * | 2/2005 | Man-Ho | H02M 3/33592 363/21.04 |
| 2005/0093622 A1 | * | 5/2005 | Lee | H03F 3/2171 330/10 |
| 2014/0153063 A1 | * | 6/2014 | Azumai | H04N 1/4056 358/474 |

FOREIGN PATENT DOCUMENTS

| | | | | |
|---|---|---|---|---|
| CN | 113970698 A | * | 1/2022 | ....... G01R 31/31727 |
| EP | 2553540 A1 | | 2/2013 | |
| WO | 2011120823 A1 | | 10/2011 | |

\* cited by examiner

*Primary Examiner* — Joseph O Schell
(74) *Attorney, Agent, or Firm* — Norton Rose Fulbright US LLP

(57) ABSTRACT

A method for monitoring a clock generator module of an electronic circuit which is configured to generate a plurality of clock signals for the electronic circuit. A monitoring module external to the circuit alternately causes the selection of one of the clock signals in the circuit as a selection signal; wherein based on the selection signal a PWM signal, whose period duration and holding time are predetermined, is generated and output; wherein the PWM signal is received from the electronic circuit by the monitoring module and measured using a monitoring clock signal to determine at least one measurement result, the at least one measurement result is compared with at least one comparison result or comparison result range, and a malfunction of the clock generator module is determined if the at least one measurement result does not match the at least one comparison result or comparison result range.

14 Claims, 3 Drawing Sheets

METHOD FOR MONITORING A CLOCK GENERATOR MODULE OF AN ELECTRONIC CIRCUIT

CROSS REFERENCE

The present application claims the benefit under 35 U.S.C. § 119 of German Patent Application No. DE 10 2023 200 498.4 filed on Jan. 24, 2023, which is expressly incorporated herein by reference in its entirety.

FIELD

The present invention relates to a method for monitoring a clock generator module of an electronic circuit, to a monitoring module, and to a computing unit and a computer program product for carrying out the method.

BACKGROUND INFORMATION

So-called timers, i.e., timer units or timer modules, are available for supporting a processing unit, such as a microcontroller or a CPU (Central Processing Unit), for time and position-related processes. Such timer modules can be designed as individual components or as peripheral modules of the processing unit and provide functions for signal recording and generation in chronological dependence on one or more internal clock pulses of the timer module. For example, input channels and/or output channels can be provided which detect or generate PWM signals relative to at least one internal clock pulse.

SUMMARY

According to the present invention, methods for monitoring a clock generator module of an electronic circuit, a monitoring module, and a computing unit and a computer program for carrying out the methods are provided. Advantageous embodiments of the present invention are disclosed herein.

According to one aspect, the present invention makes use of the measure of monitoring the functionality of a clock generator module of a circuit which generates a plurality of clock signals by selecting in alternating fashion one of the clock signals as a selection signal, wherein based on the selection signal a PWM signal is generated for which at least one measurement result is determined outside the electronic circuit, and a malfunction is determined if the at least one measurement result does not match a corresponding at least one comparison result. According to another aspect of the present invention, a plurality of PWM signals can be output and measured simultaneously or in parallel (i.e. at a plurality of outputs).

According to an example embodiment of the present invention, the determination, external to the circuit, of the measurement result takes place using an external clock signal (referred to as the monitoring clock signal), which is independent of an internal clock signal of the circuit (referred to as the circuit clock signal). As a result of this procedure, improved fault diagnosis compared to a circuit-internal monitoring is achieved.

According to an example embodiment of the present invention, the monitoring of the clock generator module relates in particular to clock pulse generation, i.e., the generation of clock signals by the clock generator module, or the generation of PWM signals from the clock signals.

The term PWM signal (PWM: pulse width modulation, also known as pulse duration modulation, PDM) is used as is standard, e.g., the PWM signal is a signal that changes from a low level to a high level at the beginning of a period of time known as the period length, remains there for a period of time known as the holding time or on-time or on-time duration, and changes back to the low level after the holding time has elapsed. The period duration and holding time of the PWM signal can be specified in particular as a respective number of clock cycles (of the selection signal), e.g., the period duration as a number P of clock cycles, where P is an integer greater than one, and the holding time as a number H of clock cycles, where H is an integer greater than or equal to one and less than P.

The term 'output channel' is intended to designate a circuit module that is set up in particular to generate PWM signals, where the period length and holding time can be configurable.

As is usual, the term 'clock signal' is intended to refer in particular to a periodic signal with a specific frequency, which changes to a high level and back to a low level in each period, for example. The duty cycle, i.e. the proportion of time during which the high level is assumed within a period, can be, but does not have to be, around 50%.

In particular, according to an example embodiment of the present invention, in the case of the alternating selection of one of the clock signals, the respectively selected clock signal can remain selected for a specific selection time interval corresponding to the selected clock signal. That is, after the selection time interval, the next selection of one of the clock signals can take place. This next selection can be made immediately at the end of the time interval, i.e. in the selection signal two consecutively selected clock signals follow each other immediately, or it can be provided that waiting a certain period of time takes place. Combinations are also possible; for example, it can be provided that the selection takes place immediately until all clock signals have been selected once or a determined number of times (e.g. cyclically), and then a certain time interval (e.g. a few seconds or minutes) is waited until this is carried out again (accordingly, there would be no continuous monitoring of the clock generator module, but rather monitoring at time intervals, e.g. in order to use resources elsewhere). For example, the time length of the corresponding selection time interval can be the same for all selected clock signals.

A monitoring module according to an example embodiment of the present invention is connected or connectable to a control interface and at least one output (for PWM signals, or output channel) of an electronic circuit, wherein the electronic circuit has a clock generator module which is configured to generate a plurality of clock signals for the electronic circuit. The monitoring module is set up to carry out a method according to the present invention or, insofar as method steps are carried out in the clock generator module, to initiate these steps. The monitoring module or parts thereof (e.g., controller and/or measuring module) can, for example, be realized on the same chip as the electronic circuit and/or outside of it on another chip that can be connected or is connected to the electronic circuit via suitable interfaces.

According to an example embodiment of the present invention, the monitoring module can have a controller which is connected or connectable to the control interface, and a measuring module which is connected or connectable to the at least one output. The controller is set up to initiate the alternating selection of one of the clock signals in the circuit, wherein the measuring module is set up to receive the PWM signal or signals and to determine the at least one measurement result. The controller is set up to compare the at least one measurement result with at least one comparison result or comparison result range and to determine a malfunction of the clock generator module if the at least one measurement result does not match the at least one comparison result or comparison result range.

According to an example embodiment of the present invention, the monitoring module or, if applicable, the controller (also referred to as the control module or controller module) and the measuring module can each be implemented by hardware circuits and/or computer programs. In particular, it can be provided that the method steps relating to the monitoring module are implemented by executing at least one corresponding computer program module in a processor which is implemented in a computing unit that includes the electronic circuit. Here the electronic circuit can be connected to the processor via interfaces that on the one hand enable the PWM signal to be transmitted from the electronic circuit to the processor and on the other hand enable the electronic circuit to be controlled by the processor. In particular, through the latter a configuration (e.g. by setting configuration registers) of the electronic circuit by a computer program module can take place, so that the electronic circuit is set up to perform the executed method steps. In particular, the output channel can be configured to generate the PWM signal and a selection circuit (multiplexer) can be configured.

A computing unit according to the present invention, for example a control device (which has a clock generator module) of a vehicle, comprises an electronic circuit having a clock generator module which is configured to generate a plurality of clock signals for the electronic circuit, and comprises the monitoring module according to the present invention.

Furthermore, the implementation of a method according to the present invention in the form of a computer program or computer program product having program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, RAMS, DVDs, and others. It is also possible to download a program via computer networks (Internet, Intranet, etc.). Such a download can be wired or wireless (e.g., via a WLAN network or a 3G, 4G, 5G or 6G connection, etc.).

Further advantages and embodiments of the present invention can be found in the description herein and the figures.

The present invention is shown schematically in the figures on the basis of exemplary embodiments and is described below with reference to the figures.

DETAILED DESCRIPTION OF EXAMPLE EMBODIMENTS

Figure 1:
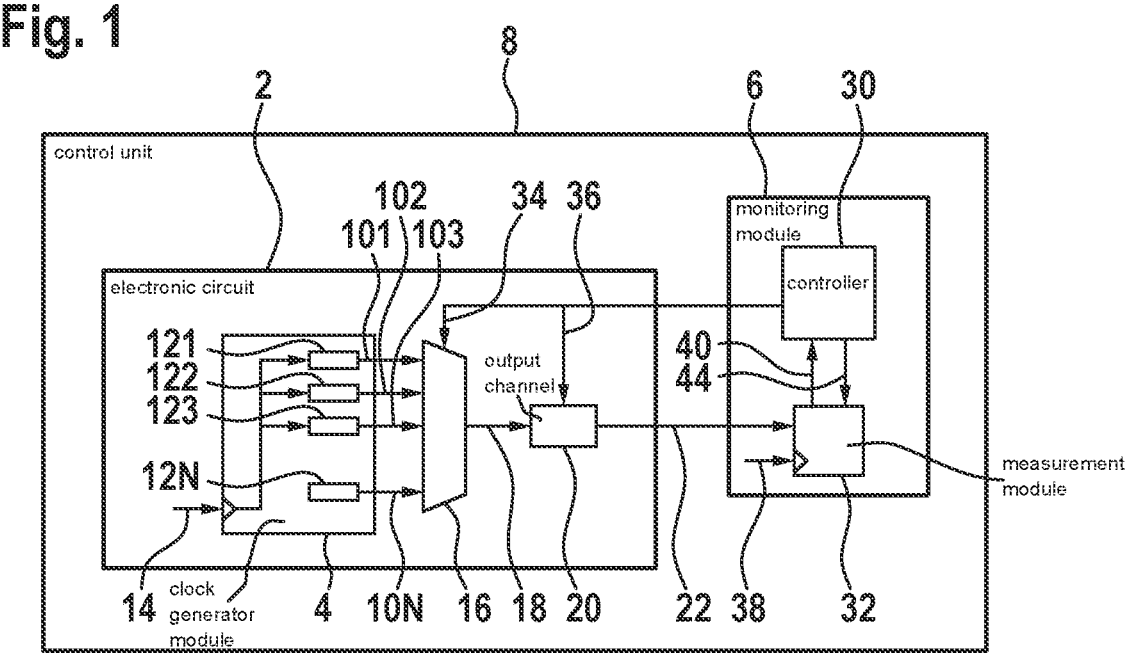
FIG. 1 shows an electronic circuit having a clock generator module and a monitoring module according to one embodiment of the present invention, as can be used for example in a control unit.

FIG. 1 shows an electronic circuit 2 with a clock generator module 4 and a monitoring module 6 according to an embodiment such as can be used for example in a control unit 8 (computing unit).

The clock generator module 4 is provided in the electronic circuit 2 to provide clock signals for the electronic circuit, which can be used by functional units of the electronic circuit 2 to clock them. The electronic circuit 2 can in particular be a generic timer module (GTM, generic timer module), as described for example in European Patent Application No. EP 2 553 540 A1. In addition to the clock generator module, such a generic timer module has, for example, a plurality of input channels for receiving signals, in particular PWM signals, and at least partially evaluating properties of received signals, and a plurality of output channels for outputting signals, in particular PWM signals with a determinable period length and holding time. Furthermore, such a generic timer module can have computing cores and a memory to enable further evaluation of received signals, for example by executing programs. A generic timer module makes it possible for example to relieve a (main) processing unit of the control unit during signal processing.

The clock generator module 4 shown has clock signal circuits 121, 122, 123, . . . , 12N (which include, for example, divider circuits or "clock dividers") in order to generate a plurality of (internal) clock signals 101, 102, 103, . . . , 10N. Each of the clock signal circuits 121, 122, 123, . . . , 12N is configured to generate, based on a circuit clock signal 14, a clock signal standing in a certain, optionally configurable, frequency relationship (and possibly phase relationship) to the circuit clock signal 14. For example, if the frequency of the switching clock signal 14 is $f_i$ and the frequency of the generated clock signal 101, 102, 103, . . . , 10N is $f_o$, the following can apply: $f_o = f_i \cdot P/Q$, where P and Q are integer values which can be configurable or adjustable (for example by setting corresponding registers). The circuit clock signal 14 is generated (internally) in the electronic circuit 2, in particular in the clock generator module 4, although it may also be the case that the circuit clock signal 14 is generated based on a clock signal provided by the control unit 8.

The electronic circuit 2 comprises a multiplexer 16 (or selection circuit) which is configured or configurable to select one of the plurality of clock signals 101, 102, 103, . . . , 10N in a controllable manner and to output a signal referred to as a selection signal 18 (or selection clock signal) which corresponds to or is equal to the respective selected one of the plurality of clock signals 101, 102, 103, . . . , 10N.

The selection of one of the several clock signals 101, 102, 103, . . . , 10N is initiated by the monitoring module 6, which for this purpose is connected to the electronic circuit 2 via a control interface or interface, e.g. a bus interface, in order to control the selection in the multiplexer 16. The monitoring module 6 can have a control module or controller 30 which initiates the selection of one of the clock signals and, for example, generates corresponding selection control signals 34 for the multiplexer 16 and controls it with them.

Figure 2:
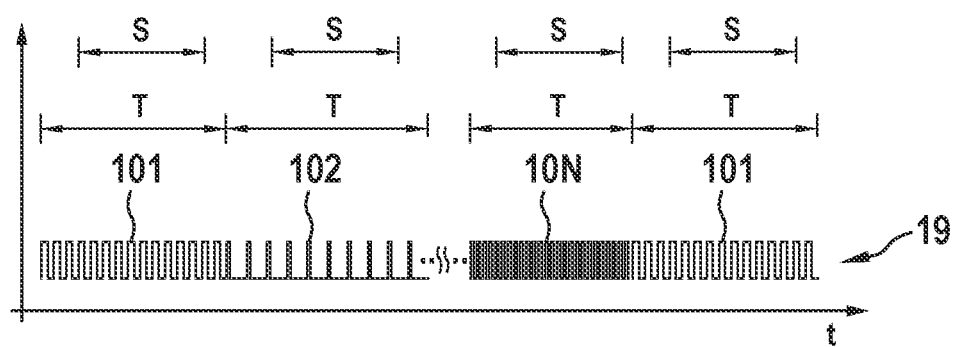
FIG. 2 shows an exemplary selection signal in the case of cyclic selection from the plurality of clock signals, according to the present invention.

The monitoring module 6 or its controller 30 is set up so that one of the several clock signals is alternately selected or its selection is initiated, where in particular each of the plurality of clock signals is to be selected at least once. In particular, it can be provided that the selection of a clock signal from the plurality of clock signals takes place in a cyclical manner (i.e. the multiple clock signals have a sequence that is run through cyclically). An exemplary selection signal 19 obtained with cyclic selection is shown in FIG. 2, in which the selection signal 19 is plotted against the time t in a diagram. Each of the plurality of clock signals 101, 102, . . . , 10N is selected for a respective time interval, referred to as selection time interval T. The selection time interval T is, by way of example, the same for all selected clock signals, but can generally be different for different selected clock signals. In addition to a cyclical selection, other selection sequences from the multiple clock signals are also possible, wherein it is also possible that different clock signals are selected differently often (for example, clock signals that are used to clock critical functions could be selected more frequently). In the example shown, one of the plurality of clock signals is always selected, i.e. the selection of consecutively selected clock signals takes place immediately one after the other without any interruption in between. More generally, it can be provided that at least between some successively selected clock signals there is a temporal interruption during which none of the plurality of clock signals is selected, wherein during the interruption the selection signal has, for example, the low signal level or is not generated at all. This can be expedient in order to be able to use resources (in the monitoring module and/or in the electronic circuit) elsewhere during the interruption.

Based on the selection signal 18, a PWM signal 22 is generated and output. The PWM signal 22 has a period length and a holding time that are predeterminable or predetermined (the holding time could also be specified by a duty cycle). The period length and the holding time are measured in relation to the selection signal 18; for example, they each correspond to a certain number of clock cycles of the selection signal 18. To generate and output the PWM signal 22, an output channel 20 of the electronic circuit 2 can be used that is configured or configurable accordingly. In particular, this configuration includes a specification for the period length and the holding time. The configuration can be fixedly specified and/or adjustable. In the latter case, the setting or configuration can take place in particular by means of corresponding PWM configuration control signals 36 by the monitoring module 6 or its controller 30.

The PWM signal 22 is received and evaluated by the monitoring module 6 to determine one or more measurement results 40, wherein, in order to determine a measurement result, in each case certain properties of the PWM signal 22 are evaluated or measured within a respective measurement time period. For example, the measurement result can be the number of rising and/or falling edges of the PWM signal 22 that occur within the measurement time span. Likewise or additionally, the period length and/or the holding time and/or the duty cycle (holding time divided by period length) could be determined within the measurement time span as measurement result. The PWM signal 22 is evaluated or the one or more measurement results 40 are determined in particular using a clock signal external to the circuit, i.e. a clock signal independent of the electronic circuit 2, which is referred to as the monitoring clock signal 38. This can, for example, be generated in the monitoring module 6 and/or provided by the control unit. Measurement time spans and/or selection time intervals can, for example, each correspond to a certain number of clock cycles of the monitoring clock signal 38.

A plurality of measurement time spans can be provided for which a measurement result is determined in each case (where a measurement result can comprise a plurality of measurement values). In this case, a measurement time span can in each case be assigned to each of the alternately selected clock signals, wherein the assigned measurement time span should in each case be temporally within the selection time interval during which the corresponding clock signal is selected. For example, measuring time spans S are shown in FIG. 2 that are within the corresponding selection time intervals T. In general, the measurement time spans can also be selected independently of clock signals and/or selection time intervals. In this case, it should be noted that a measurement time span can overlap with a change of the selected clock signal, and thus the characteristics of the PWM signal that are evaluated can change during the measurement time span (in particular, a method for determining the measurement result can then be selected so that the measurement results are independent of changes in the selection, e.g. the duty cycle could be used as the measurement result).

In particular, as shown, a measurement module 32 can be provided in the monitoring module 6 for the determination of the measurement results 40, which measurement module is set up to receive the PWM signal 22, determine measurement results 40 based on it, and transmit measurement results to the controller 40. It can be provided that the measurement module 32 is configurable and/or controllable by the controller 30 by means of measurement control signals 44. For example, it is possible to configure which method is to be used to determine measurement results, if the measurement module 32 is capable of using different methods. Parameters such as the length of the measurement time span can also be configured. Control information can also be transmitted to the measurement module 32 about when measurement time spans should begin and/or over which periods of time they should extend. In particular, this can ensure that the measurement time spans lie within the selection time intervals. This can be useful, as generally only the controller, but not the measuring module, initially knows which selection time intervals are used to select the particular clock signals. If the selection time intervals all follow each other immediately and are of the same length, a single coordination signal may for example be sufficient. A start signal indicating the start of a measurement time span and an end signal indicating the end of the measurement time span could also be transmitted; or, if all measurement time spans have the same time length (which can be configured), only a start signal may be transmitted.

The monitoring module 6, in particular its controller 30, is further set up to compare measurement results 40 with corresponding (i.e. corresponding to the relevant selected clock signal) expected measurement results, referred to as comparison results or reference results, and to determine that a malfunction of the clock generator module 4 is present (or potentially present, since in principle a malfunction could also occur in other elements) if a measurement result does not match the corresponding comparison result. A tolerance can be taken into account in the comparison, e.g. that the above-mentioned number of rising and/or falling edges of the PWM signal 22 within the measurement time span may deviate from the corresponding comparison result (comparison number) by one or by a small number. The expected comparison results can be stored by the monitoring module 6, in particular its controller 30. The expected comparison results can be determined, for example, by calculating them on the basis of the properties of the clock signals and the measurement method (in principle, a corresponding calculation formula could also be implemented in the monitoring module or the controller, so that the comparison results themselves do not have to be stored; rather, only information about the clock signals, for example their frequencies, must be stored and/or can be queried by the clock generator module, for example by reading corresponding registers) and/or by measuring them when the clock generator module 4 is known to be functioning without errors.

More generally, a comparison can be made with a plurality of comparison results or with a comparison result range, e.g. to take tolerances into account or to take into account the above-mentioned case in which a measurement time span can overlap with a change in the selection of the clock signal.

Figure 3:
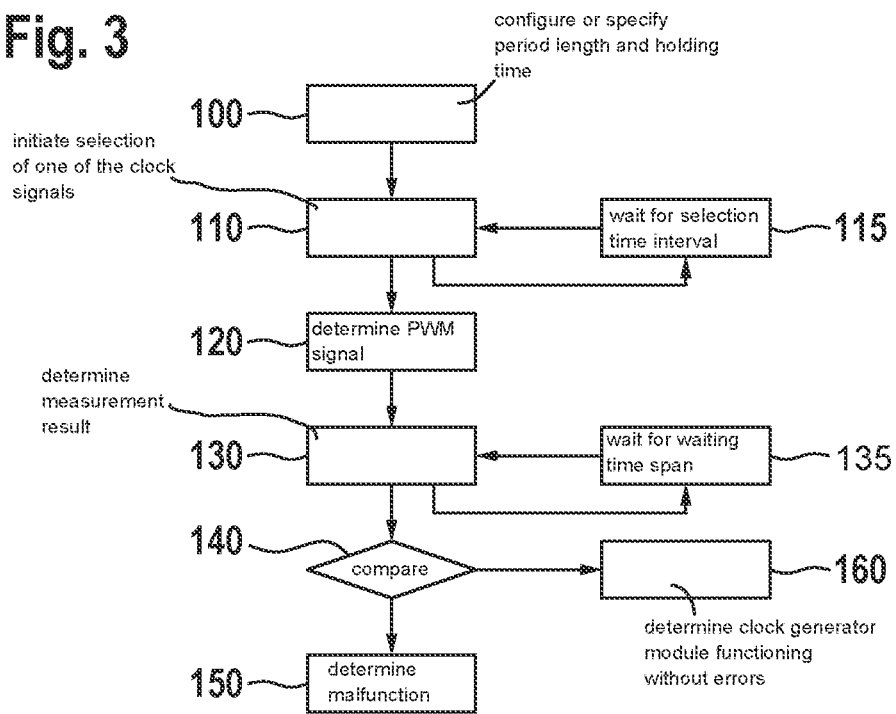
FIG. 3 shows a flowchart according to an embodiment of the method of the present invention for monitoring a clock generator module of an electronic circuit.

FIG. 3 shows a flowchart according to an embodiment of the method for monitoring a clock generator module of an electronic circuit, such as is implemented, for example, by the circuit arrangement (electronic circuit 2 and monitoring module 6) shown in FIG. 1.

In an optional step 100, the monitoring module, in particular its controller, may configure or specify the period length and the holding time to be used in the generation of the PWM signal (step 120) (for example by means of PWM configuration control signals, as described) and/or configure the determination of the measurement results (e.g. the methods used and/or the measurement time spans).

In step 110, the selection of one of the plurality of clock signals is initiated in the electronic circuit, for example by the controller of the monitoring module, so that the selection signal is formed in the electronic circuit according to the currently selected clock signal. After changing the selection of one of the clock signals, in particular in step 115 waiting takes place for a selection time interval with a specific time length, possibly dependent on the selected clock signal, and then another of the clock signals is selected. Overall, one of the plurality of clock signals is thus selected in alternating fashion, so that the selection signal represents an alternating sequence of one of the clock signals (corresponding to the particular selection).

In step 120, a PWM Signal having the predefined period length and holding time is determined and output by the electronic circuit based on the selection signal. In particular, the period length and holding time are each given as the number of clock cycles, which are counted corresponding to the number of clock cycles included in the selection signal.

In step 130, the monitoring module or its measurement module determines a measurement result based on the PWM signal during a measurement time span. For this purpose, in particular the monitoring clock signal 38 is used which is independent of the circuit clock signal or the plurality of clock signals derived therefrom. A plurality of measuring time spans are provided, wherein a waiting time span can be waited after each measuring time span in step 135 until the next measuring time span begins. The measurement time spans and, if applicable, the waiting time spans between the measurement time spans are determined in particular in such a way that each measurement time span lies within a corresponding selection time interval. The measuring time spans and, if necessary, the waiting time spans are controlled for example by the controller of the monitoring module. Overall, a plurality of successive measurement results are determined, i.e. a sequence of measurement results is determined.

In step 140, each of the measurement results is compared with at least one corresponding comparison result (or comparison result range). If these match, or match within a tolerance, it can be determined in step 160 that the clock generator module is functioning without errors.

If, on the other hand, it is determined that one of the measurement results does not match the corresponding comparison result, or does not match it within a tolerance, a (possible) malfunction of the clock generator module is determined in step 150. In this case, for example an error message can be generated and possibly output and/or an interrupt can be generated.

Figure 4:
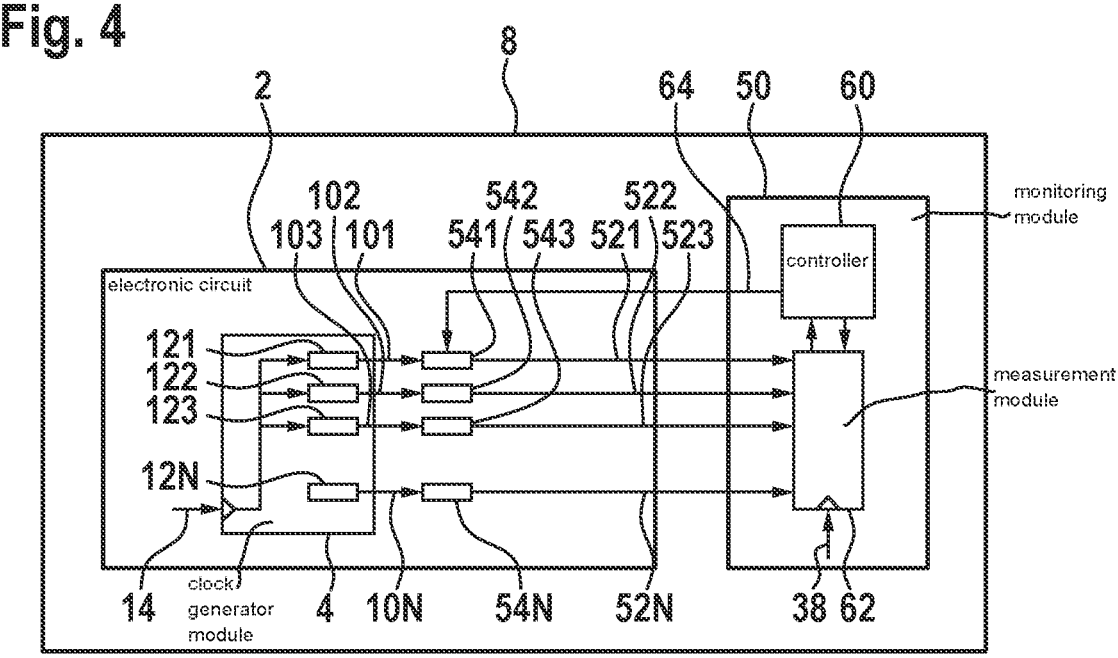
FIG. 4 shows an electronic circuit having a clock generator module and a monitoring module according to a further embodiment of the present invention, as can be used for example in a control device.

FIG. 4 shows an electronic circuit 2 having a clock generator module 4 and a monitoring module 50 according to a further embodiment, such as can be used, for example, in a control device 8.

The electronic circuit 2 and its clock generator module 4 are essentially as described in connection with FIG. 1, to which reference is made here, using the same reference signs.

In contrast to the embodiment of FIG. 1, an output channel 541, 542, 543, . . . , 54N is provided for each of the plurality of clock signals 101, 102, 103, . . . 10N generated by the clock generator module 4 in order to generate and output, in parallel or simultaneously, a plurality of PWM signals 521, 522, 523, . . . , 52N. Each of the output channels 541, 542, 543, . . . , 54N is set up to generate and output one of the PWM signals 521, 522, 523, . . . , 52N with a predetermined or predeterminable period length and holding time on the basis of that one of the plurality of clock signals 101, 102, 103, . . . 10N which is received by the respective output channel. The function of each of the output channels 541, 542, 543, . . . , 54N thus corresponds to the function described above of the output channel 20 of FIG. 1. The period length and holding time can be selected differently for different output channels. The monitoring module 50 can have a control module or a controller 60 which is set up to configure the period length and holding time in the output channels, for example by the controller 60 generating corresponding PWM configuration control signals for the output channels 541, 542, 543, . . . , 54N and controlling these channels therewith.

The monitoring module 50 or a measurement module 62 provided therein is set up to receive and evaluate the PWM signals 521, 522, . . . , 52N in order to generate measurement results and transmit them to the controller 60, for example. A measurement result can be determined for each of the PWM signals 521, 522, 523, . . . , 52N, as described in connection with FIG. 1. Corresponding measurement time spans can be selected for the various PWM signals 521, 522, 523, . . . , 52N independently of one another (e.g. overlapping in time and/or not overlapping in time), e.g. specified by the controller 60 by means of measurement control signals. A measurement result can be determined repeatedly for each PWM signal. In particular, the measurement results are again determined using a monitoring clock signal 38.

As in the embodiment of FIG. 1, the monitoring module 50 or its controller 60 of the embodiment of FIG. 4 is set up to compare the measurement results with corresponding comparison results and to detect a (possible) malfunction of the clock generator module 4 if these do not match, or do not match within a tolerance.

By monitoring in parallel the multiple clock signals 101, 102, 103, . . . 10N or the PWM signals 521, 522, 523, . . . , 52N generated from them, errors can be detected at an early stage.

Figure 5:
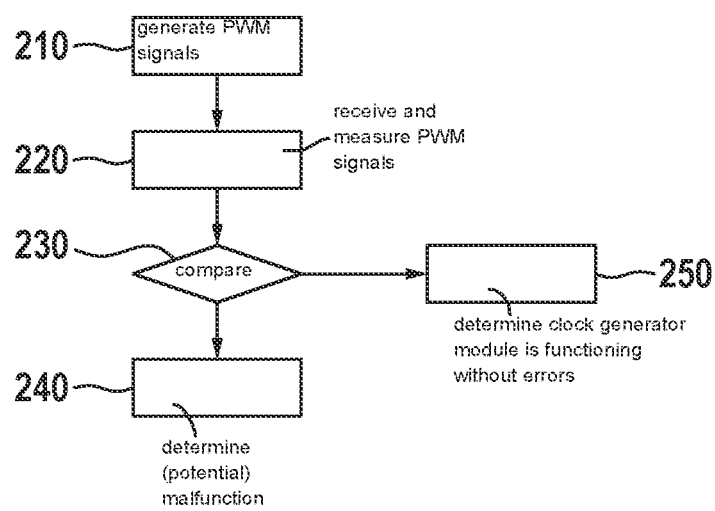
FIG. 5 shows a flowchart according to a further embodiment of the method of the present invention for monitoring a clock generator module of an electronic circuit.

FIG. 5 shows a flowchart according to another embodiment of the method for monitoring a clock generator module of an electronic circuit, such as is implemented, for example, by the circuit arrangement (electronic circuit 2 and monitoring module 50) shown in FIG. 4.

In step 210, the circuit generates a plurality of PWM signals whose period durations and holding times are predetermined, each based on one of the clock signals.

In step 220, a monitoring module (50) external to the circuit receives and measures the plurality of PWM signals to determine a plurality of measurement results.

In step 230, the plurality of measurement results are compared with a plurality of corresponding comparison results (i.e. expected measurement results) or comparison result ranges, wherein tolerances can be taken into account. If the measurement results match the comparison results or comparison result ranges, it can be determined in step 250 that the clock generator module is functioning without errors.

On the other hand, if at least one of the measurement results does not match the associated comparison result or comparison result range, a (potential) malfunction of the clock generator module is determined in step 240. In this case, for example an error message can be generated and possibly output and/or an interrupt can be generated.

What is claimed is:

1. A method for monitoring a clock generator module of an electronic circuit, the clock generator module being configured to generate a plurality of clock signals for the electronic circuit, the method comprising:
    initiating in alternating fashion, by a monitoring module external to the electronic circuit, a selection of one of the clock signals in the electronic circuit as a selection signal, wherein a PWM signal, whose period duration and holding time are predetermined, is generated and output based on the selection signal;
    receiving the PWM signal by the monitoring module from the electronic circuit and measuring the received PWM signal using a monitoring clock signal to determine at least one measurement result;
    comparing the at least one measurement result to at least one comparison result or comparison result range; and
    determining a malfunction of the clock generator module when the at least one measurement result does not match the at least one comparison result or comparison result range.

2. The method according to claim 1, wherein in the alternating selection of one of the plurality of clock signals, the selected clock signal remains selected for a particular selection time interval corresponding to the selected clock signal.

3. The method according to claim 2, wherein the alternating selection takes place in such a way that each of the plurality of clock signals is selected at least once, wherein each selected clock signal remains selected for a particular selection time interval corresponding to the selected clock signal, and wherein a temporal length of the selection time interval is a same length for all selected clock signals.

4. The method according to claim 1, wherein the selection of one of the plurality of clock signals takes place according to a specific sequence of the plurality of clock signals, cyclically.

5. The method according to claim 1, wherein the alternating selection takes place in such a way that each of the plurality of clock signals is selected at least once.

6. The method according to claim 1, wherein the at least one measurement result is determined based on the PWM signal during a respective measurement time span, and wherein the at least one measurement result includes one or more of: a number of rising edges of the PWM signal during the respective measurement time span, a number of falling edges of the PWM signal during the respective measurement time span, a period length of the PWM signal during the respective measurement time span, a holding time of the PWM signal during the respective measurement time span, a duty cycle of the PWM signal during the respective measurement time span.

7. The method according to claim 6, wherein in the alternating selection of one of the plurality of clock signals, the selected clock signal remains selected for a particular selection time interval corresponding to the selected clock signal, and wherein the respective measurement time span is included within a time interval during the selection time interval corresponding to the selected clock signal.

8. The method according to claim 1, wherein the electronic circuit is configured or programmed by the monitoring module to determine the selection signal and the PWM signal based thereon, wherein a configuration of the period duration and the holding time takes place.

9. The method according to claim 1, wherein the period duration and the holding time are each predetermined as a number of clock cycles which are counted during the generation of the PWM signal by the selection signal.

10. A method for monitoring a clock generator module of an electronic circuit that is configured to generate a plurality of internal clock signals for the electronic circuit, the method comprising:
    generating and outputting in parallel, using the electronic circuit, a plurality of PWM signals, whose period durations and holding times are predetermined, the generating of each of the PWM signals being based on a respective one of the clock signals;
    receiving and measuring the plurality of PWM signals by a circuit-external monitoring module to determine a plurality of measurement results; and
    determining a malfunction of the clock generator module when at least one of the plurality of measurement results does not match a corresponding comparison result or comparison result range.

11. A monitoring module connected or connectable to a control interface and at least one output of an electronic circuit which includes a clock generator module configured to generate a plurality of clock signals for the electronic circuit, wherein the monitoring module is configured to:
    initiate in alternating fashion a selection of one of the clock signals in the electronic circuit as a selection signal, wherein a PWM signal, whose period duration and holding time are predetermined, is generated and output based on the selection signal;
    receive the PWM signal from the electronic circuit and measure the received PWM signal using a monitoring clock signal to determine at least one measurement result;
    compare the at least one measurement result to at least one comparison result or comparison result range; and
    determine a malfunction of the clock generator module when the at least one measurement result does not match the at least one comparison result or comparison result range.

12. The monitoring module according to claim 11, wherein the monitoring module comprises a controller connected or connectable to the control interface, and a measurement module connected or connectable to the at least one output; wherein the controller is configured to initiate the alternating selection of one of the clock signals in the circuit, wherein the measurement module is configured to receive the PWM signal and to determine the at least one measurement result, and wherein the controller is configured to compare the at least one measurement result with at least one comparison result or comparison result range and to determine the malfunction of the clock generator module when the at least one measurement result does not match the at least one comparison result or comparison result range.

13. A computing unit, comprising:
an electronic circuit having a clock generator module which is configured to generate a plurality of clock signals for the electronic circuit; and
a monitoring module connected or connectable to a control interface and at least one output of the electronic circuit, the monitoring module configured to:
initiate in alternating fashion a selection of one of the clock signals in the electronic circuit as a selection signal, wherein a PWM signal, whose period duration and holding time are predetermined, is generated and output based on the selection signal;
receive the PWM signal the electronic circuit and measure the received PWM signal using a monitoring clock signal to determine at least one measurement result;
compare the at least one measurement result to at least one comparison result or comparison result range; and
determine a malfunction of the clock generator module when the at least one measurement result does not match the at least one comparison result or comparison result range.

14. A program product, comprising:
a non-transitory machine-readable storage medium including a computer program for monitoring a clock generator module of an electronic circuit, the clock generator module being configured to generate a plurality of clock signals for the electronic circuit, the computer program, when executed by a computing unit, causing the computing unit to perform:
initiating in alternating fashion, by a monitoring module external to the electronic circuit, a selection of one of the clock signals in the electronic circuit as a selection signal, wherein a PWM signal, whose period duration and holding time are predetermined, is generated and output based on the selection signal;
receiving the PWM signal by the monitoring module from the electronic circuit and measuring the received PWM signal using a monitoring clock signal to determine at least one measurement result;
comparing the at least one measurement result to at least one comparison result or comparison result range; and
determining a malfunction of the clock generator module when the at least one measurement result does not match the at least one comparison result or comparison result range.

* * * * *